(12) United States Patent
Öhlund

(10) Patent No.: US 6,264,280 B1
(45) Date of Patent: Jul. 24, 2001

(54) SAFETY-BELT ARRANGEMENT

(75) Inventor: Anders Öhlund, Lindome (SE)

(73) Assignee: AB Volvo, Göteborg (SE)

( * ) Notice: Subject to any disclaimer, the term of this patent is extended or adjusted under 35 U.S.C. 154(b) by 0 days.

(21) Appl. No.: 09/142,649

(22) PCT Filed: Mar. 11, 1997

(86) PCT No.: PCT/SE97/00418
§ 371 Date: Apr. 15, 1999
§ 102(e) Date: Apr. 15, 1999

(87) PCT Pub. No.: WO97/33777
PCT Pub. Date: Sep. 18, 1997

(30) Foreign Application Priority Data

Mar. 11, 1996 (SE) .................................................. 9600935

(51) Int. Cl.$^7$ .................................................. B60R 21/10
(52) U.S. Cl. ...................... 297/474; 297/478; 297/216.13
(58) Field of Search .................................. 297/474, 475, 297/476, 478, 216.13; 280/801.1; 242/384.4

(56) References Cited

U.S. PATENT DOCUMENTS 4,310,176 * 1/1982 Furusawa et al. .................. 297/474
5,088,794   2/1992 Iwami et al. .
5,294,150   3/1994 Steffens, Jr. .
5,716,102 * 2/1998 Ray et al. ....................... 297/216.13

FOREIGN PATENT DOCUMENTS 42 06 093 C1   7/1993 (DE) .
0 138 507 A2   4/1985 (EP) .

* cited by examiner

Primary Examiner—Anthony D. Barfield
(74) Attorney, Agent, or Firm—Royston, Rayzor, Vickery, Novak & Druce, L.L.P.

(57) ABSTRACT

Safety belt devices are disclosed for vehicles comprising a seat belt, a retractor for retracting the seat belt, a seat belt guide for guiding the seat belt, a rotatable drum for displacing the seat belt guide between a normal operating condition and a tightened condition for the seat belt, the seat belt guide mounted on the rotatable drum, and an activator for activating the rotatable drum into the tightened condition, the rotatable drum including an energy absorber for reducing the force exerted upon the seat belt guide by the seat belt during return of the seat belt guide from the tightened condition to its normal operating condition.

9 Claims, 3 Drawing Sheets

SAFETY-BELT ARRANGEMENT

FIELD OF THE INVENTION

The present invention relates to a safety belt arrangement for vehicles. More particularly, the present invention has application to the field of safety belts which are provided with a pretensioning device.

BACKGROUND OF THE INVENTION

In the field of motor vehicles, it is common to use safety belts comprising a retractor device which is fixed to the floor of the vehicle or in the so-called B-post (i.e. the post which is formed by the bodywork to the side of each front seat), and a seatbelt strap running from the retractor device and across the body of the user. Normally, a guiding device for the strap is arranged at the same level as the shoulder portion of the user. The safety belt is locked in an anchor on the vehicle's floor. In safety belts of the so-called three-point type, the strap is also guided about the anchor, allowing it to run across the waist of the user.

As regards operation of a safety belt, certain demands and requirements exist. Firstly, it is important that the guiding device is arranged so that the strap is guided in a position which is close to the shoulder portion of the user, i.e. in a position which is adapted to the height of the user. In this manner, optimum protection can be provided in the event of a collision. Furthermore, there is a need for a guiding device which provides height adjustment, i.e. which allows individual setting of the position of the guiding point. In particular, there is a demand for an automatic height adjustment device, relieving the user from having to adjust any control or the like in order to set the guiding device in a correct manner.

Furthermore, there is often a requirement that the safety belt should comprise some type of pretensioning device which, in a known manner, is adapted to tension the belt in the event of a collision. In this regard, the strap is intended to be tightened against the upper torso of the user immediately after the collision, i.e. before the user is urged forwards due to his weight. In this manner, the pretensioning device can prevent or reduce personal injuries in connection with collisions. A device for pretensioning a strap by means of a pyrotechnic pretensioner is known from European Patent No. 138,507.

Furthermore, there is a demand for a force-limiting operation of the safety belt in the event of a collision. This means that the safety belt should not be completely unyielding. Instead, it should absorb part of the energy which is developed when the user is urged forwards during heavy retardation.

In recent years, safety belts have been developed in which both the retractor and the guiding device are integrated into the backrest of the vehicle seat (so-called "belt-in-seat" devices), i.e. the retractor of the safety belt is not fixed to the body of the vehicle but instead to the vehicle seat. Such systems provide improved comfort and protection since the strap will always be in the same position in relation to the user, independently of the position of the vehicle seat. Furthermore, a simplified design for the B-post can be provided, as regards the technological demands, the space available and the design, since in this case the B-post does not have to be provided with any belt retractor and guiding device. Finally, a shorter strap can be used, which lowers the costs and decreases the risk for a "film-reel" effect to occur in the retractor. This means that a small amount of the strap is fed out due to the fact that it is packed on the retractor, in spite of the fact that the strap is locked.

Several types of height adjustment devices, pretensioning devices and force-limiting devices are known. However, a problem in connection with today's safety belts resides in the fact that they do not allow a plurality of functions to be integrated into the same construction. This problem implies that today's systems often become space consuming as well as costly. In particular, this is a problem in connection with the socalled "belt-in-seat" devices.

SUMMARY OF THE INVENTION

A main object of the present invention is therefore to provide an improved device in connection with safety belts for motor vehicles, into which a plurality of functions can be integrated and which also constitutes a simple, compact and low-cost unit.

In accordance with the present invention, this and other objects have now been realized by the invention of a safety belt device for vehicles comprising a seat belt, a retractor for retracting the seat belt, a seat belt guide for guiding the seat belt, a displacement member for displacing the seat belt guide between a normal operating condition and a tightened condition for the seat belt, the displacement member comprising a rotatable drum upon which the seat belt guide is mounted, and an activator for activating the displacement member into the tightened condition, the displacement member including energy absorbing means for reducing the force exerted upon the seat belt guide by the seat belt during return of the seat belt guide from the tightened condition to the normal operating condition. In one embodiment, the activator causes rotation of the rotatable drum.

In accordance with one embodiment of the safety belt device of the present invention, the retractor includes a central axis of rotation and the rotatable drum includes a central axis of rotation, the seat belt guide extending in a direction substantially parallel to the central axes of rotation of the retractor and the rotatable drum.

In accordance with another embodiment of the safety belt device of the present invention, the energy absorbing means comprises a pin associated with the rotatable drum and a slot cooperating with the pin. In a preferred embodiment, the safety belt device includes a bracket supporting the rotatable drum, the bracket fixedly mounted with respect to the vehicle, the pin protruding from the rotatable drum and the slot disposed in the bracket.

In accordance with another embodiment of the safety belt device of the present invention, the rotatable drum is adapted to displace the seat belt guide along a circular arc.

In accordance with another embodiment of the safety belt device of the present invention, the activator activates the displacement member into the tightened condition in response to a collision of the vehicle. In a preferred embodiment, the safety belt device includes an acceleration sensor mounted in the vehicle, the activator comprising a pyrotechnic pretensioning device activated by means of the acceleration sensor.

In accordance with the present invention, a vehicle seat is also provided including a safety belt device as set forth above.

The present invention comprises a combined guiding, pretensioning and force-limiting apparatus, which preferably is integrated with the vehicle seat. In this manner, a high degree of comfort and protection for the user can be provided.

BRIEF DESCRIPTION OF THE DRAWINGS

The present invention will be described in greater detail in the following detailed description with reference to the annexed drawings, in which.

DETAILED DESCRIPTION

Figure 1:
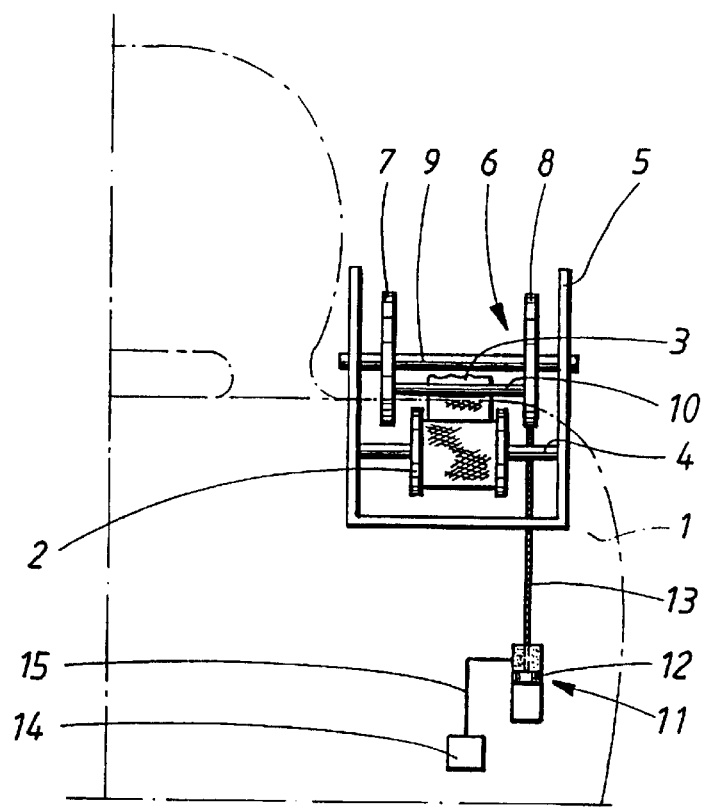
FIG. 1 is a front, elevational view of a combined guiding, pretensioning and force-limiting apparatus according to the present invention.
Figure 2:
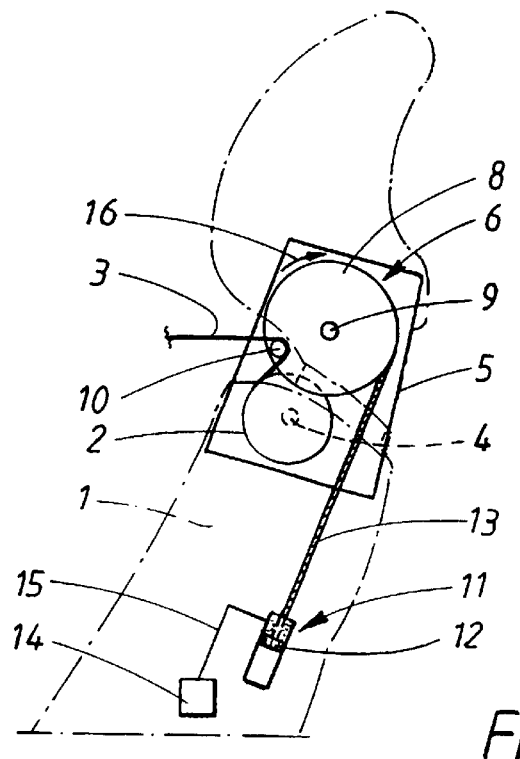
FIG. 2 is a side, elevational view of the apparatus according to FIG. 1.

Referring to the Drawings, FIGS. 1 and 2 show a front view and a side view, respectively, of an arrangement according to the present invention. According to a preferred embodiment, the apparatus is arranged in a vehicle seat 1, preferably on its backrest. The arrangement comprises a retractor 2 onto which a strap 3 of a safety belt can be wound. The retractor 2, which is of conventional type, is spring-is biased so that the strap 3 is wound automatically when not in use. Furthermore, the retractor 2 comprises a shaft 4 which is mounted in corresponding holes in a fitting in the form of a mounting bracket 5. The retractor 2 is pivotally arranged in relation to the shaft 4. The mounting bracket 5 is fixed on the vehicle seat 1.

A drum 6 is arranged on the mounting bracket 5, which drum constitutes a guiding device for the strap 3. The guiding drum 6 comprises two essentially circular plates or discs, 7 and 8, which are arranged on a through shaft 9. The shaft 9 protrudes a certain distance out of the respective discs, 7 and 8, and through corresponding holes in the mounting bracket 5. In this manner, the drum 6 is rotatably arranged within the mounting bracket 5. Furthermore, the drum 6 comprises a transverse guiding pin 10 which is mounted between the discs, 7 and 8. The guiding pin 10 is preferably attached on a point of the respective disc 7, 8 which is close to the outer edge of the respective disc 7, 8. Preferably, the guiding pin 10 is pivotally arranged between the discs, 7 and 8, but may also be rotationally fixed.

The disc 6 is arranged so that it can be rotated in both directions about the axis of symmetry which is defined by through shaft 9. The strap 3 is arranged so that, during use, it is guided about the guiding pin 10 and is wound about the retractor 2 (see particularly FIG. 2).

A pretensioning device 11 is arranged in connection with the drum 6. The pretensioning device 11 is preferably enclosed and fixed in the backrest of the seat 1, and according to this embodiment it is of the pyrotechnic type, which is a type of pretensioner which is known. A piston 12 is arranged inside the pretensioner 11, which piston 12 is connected to a connecting element 13, which preferably comprises a wire or a strap. One of the ends of the wire 13 is fixed in the piston 12, whereas its other end is fixed on one of the end discs 8 of the drum 6, preferably on the periphery thereof.

An explosive charge (not shown) is arranged in the pretensioner 11 and can be ignited by means of a trigger device (not shown). In this manner, the piston 12 will be forced to be displaced in the downward direction, which in turn forces the wire 13 to be pulled downwards. Furthermore, the trigger device of the pretensioner 11 is connected to a sensor device 14 by means of a connector 15. The sensor 14 is preferably of the acceleration sensor type, which detects whether the vehicle is heavily retarded. Preferably, the sensor 14 is arranged in the passenger compartment of the vehicle.

The occurrence of a collision will be detected by means of the sensor 14, causing the explosive charge to detonate. This causes the wire 13 to be pulled into the pretensioner 11, thereby rotating the drum 6 a certain amount in the clockwise direction. This is indicated by means of the arrow 16 in FIG. 2.

It should be noted that the position of the pretensioner 11 and the length of the wire 13 are adapted so that during normal use (i.e. as long as no collision has occurred) the drum 6 can be turned to such an angular position that the guiding pin 10 is set optimally according to the user of the seatbelt. To this end, the drum 6 is preferably spring-biased so as to be urged to be rotated in the counterclockwise direction when in an uninfluenced state.

The arrangement preferably comprises a housing or a hood (not shown), which can be made of metal or hard plastic and which can be provided with a slit through which the safety belt 3 runs. Alternatively, the entire arrangement can be integrated in the upper portion of the backrest of the vehicle seat 1.

Figure 3:
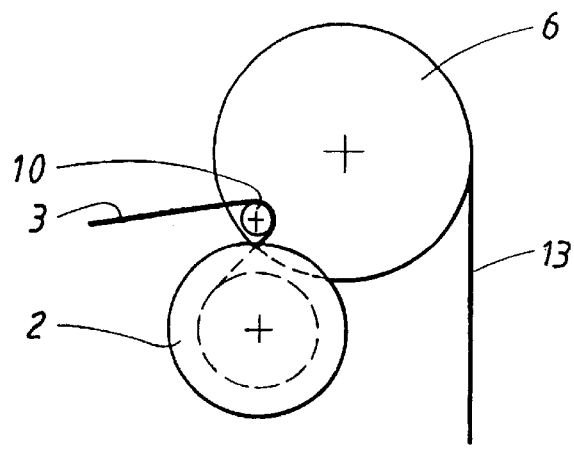
FIG. 3 is a side, elevational, schematic view showing the apparatus according to the present invention in a first operating position.
Figure 4:
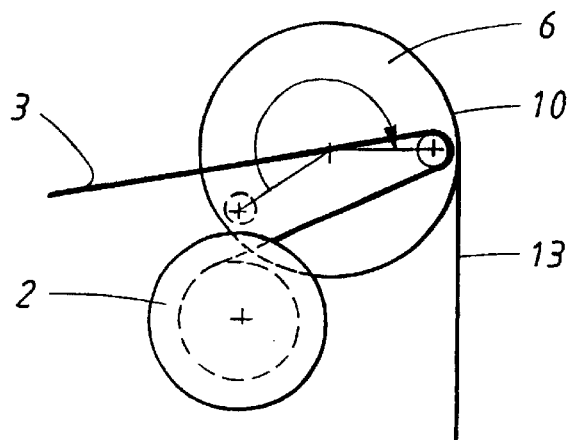
FIG. 4 is a side, elevational, schematic view showing the apparatus according to the present invention in a second operating position.
Figure 5:
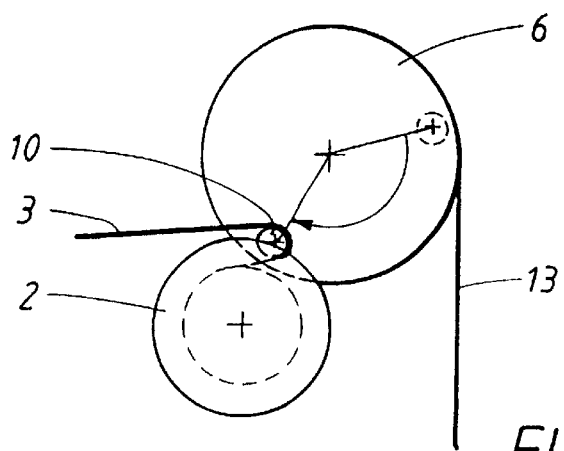
FIG. 5 is a side, elevational, schematic view showing the apparatus according to the present invention in a third operating position.

The principle operation of the present invention will now be described with reference to FIGS. 3, 4 and 5. Initially, i.e. during normal use of the safety belt, the strap 3 runs about the guiding pin 10. Furthermore, the strap 3 is fixed to and arranged to be wound on the retractor 2. This initial condition is shown in FIG. 3.

In the event of a collision, the pyrotechnic pretensioning mechanism 11 (not shown in FIGS. 3–5) will be activated, causing the wire 13 to be tightened a small amount. This causes the drum 6 to be rotated a corresponding amount in the clockwise direction. The length of the wire 13 is preferably adapted so that rotation of the drum 6 slightly more than 180° is obtained after activation of the pretensioner 11. This rotation corresponds to a predetermined pretensioning of the strap 3. After the rotation, i.e. immediately after the collision, the drum 6 will consequently adopt the position shown in FIG. 4.

When the body of the user is urged forwards due to the high retardation of the vehicle, the strap 3 will exert a force on the guiding pin 10, thereby causing the latter to affect the drum 6 to be rotated a further amount in the clockwise direction. During this continued rotation (which is shown in FIG. 5), a force-limitation takes place, i.e. the energy which is developed as a consequence of the high retardation will be absorbed to a certain extent. To this end, the drum 6 is adapted to provide rotational resistance during this phase of the rotation, which rotation occurs as a result of the strap 3 exerting a force upon the guiding pin 10.

Figure 6:
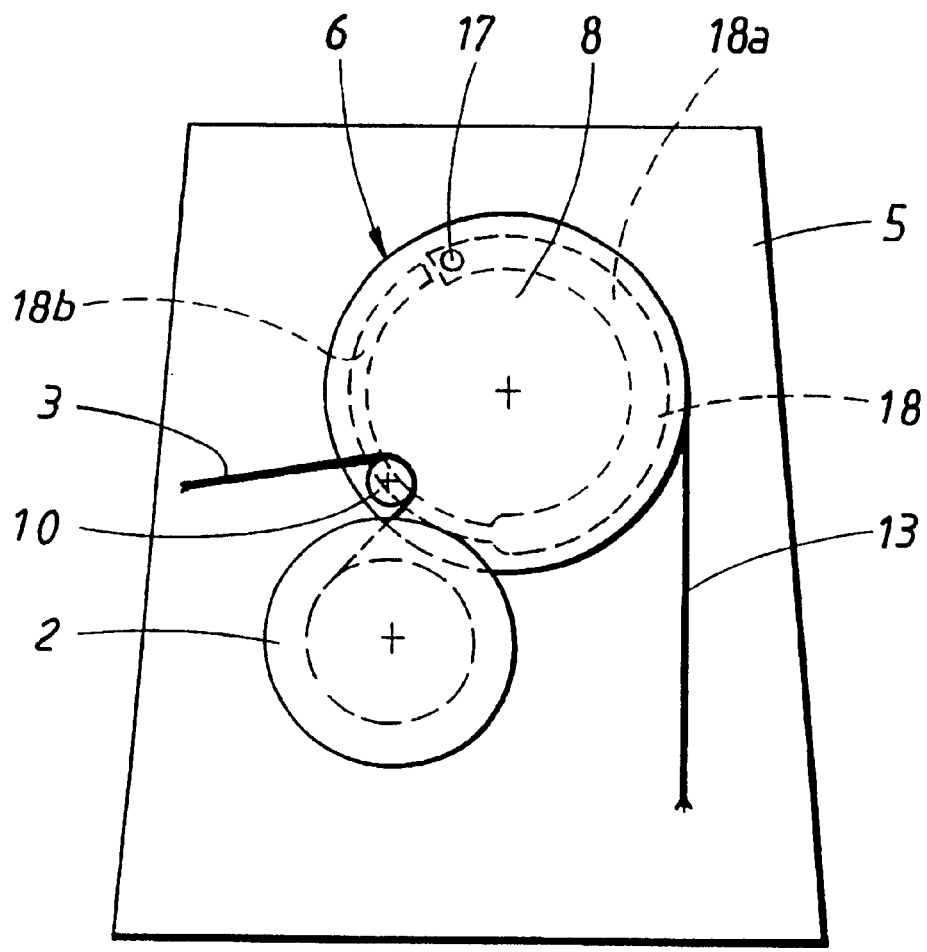
FIG. 6 is a side, elevational, schematic view of apparatus for force limitation according to a particular embodiment of the present invention.

According to an alternative embodiment, this rotational resistance, which in turn gives rise to energy-absorption, can be obtained by means of a force-limiting arrangement according to what is shown separately in FIG. 6. This figure is a schematical side view showing that the drum 6 is provided with a pin or stud 17 which runs in a corresponding, essentially annular slot 18 in the mounting bracket 5. The pin 17 is positioned on the outside of the drum 6, i.e. on the side of the disc 8 which faces the mounting bracket 5. The slot 18 is preferably divided into two sections, 18a and 18b, respectively. The first section 18a extends in a manner which corresponds to the movement by the drum 6 during activation of the pretensioner 11, which is shown in detail in FIGS. 3 and 4. This first section 18a is relatively wide, allowing the pin 17 to run freely during this pretensioning phase. During the force-limiting phase (cf. FIG. 5), the pin 17 will run in the second section 18b of the slot 18. This second section 18b is considerably narrower than said first section 18a. This means that the slot will exert a force on the pin 17 during this force-limiting phase, thereby providing the energy-absorbing action of the drum 6. For the purpose of obtaining suitable energy absorption, the pin 17 is preferably manufactured from steel. The mounting bracket 5 is preferably manufactured from steel, alternatively from magnesium or corresponding material.

According to an alternative embodiment, the present invention can be used as follows. In the initial state, i.e. during normal use of the safety belt, the strap 3 runs about the guiding pin 10 in the same manner as shown in FIG. 3. In the event of a collision, the pyrotechnical pretensioning mechanism 11 will be activated, thereby tightening the wire 13. However, the wire will only be tightened so much that the drum 6 is rotated slightly less than 180° from its initial position. When the vehicle occupant subsequently is urged forward, the strap 3 will exert a force upon the guiding pin 10 so that the guiding pin in turn forces the drum 6 to be rotated a certain amount in the counterclockwise direction. During this rotational phase, energy will be absorbed by means of the pretensioner. To this end, the pretensioner is provided with an energy-absorbing mechanism (not shown), for example a spring arrangement which absorbs energy arising due to the fact that the strap 3 exerts a force upon the guiding pin 10.

The present invention is not limited to the above-mentioned embodiments, but may be varied within the scope of the subsequent claims. For example, the invention can either be integrated in the vehicle seat 1 or arranged separately.

Furthermore, the present invention allows for automatic height adjustment due to the fact that the guiding pin 10 is set according to the height of a user, i.e. the shoulder height of the user. The invention can be supplemented with a device for fixing the drum 6 in a predetermined angular position, thereby fixing the guiding pin 10 in a certain position in relation to the shoulder portion of the user.

As regards the force-limiting operation of the present invention, the resistance and thus also the energy-absorption can be affected through the choice of material of the pin 17 and the mounting bracket 5 (see FIG. 6). Furthermore, the slot 18 can be designed with a gradually diminishing width or with two or more sections of different widths.

The drum 6 can be dimensioned so that a high resistance is provided at the beginning of the rotational movement and a lower resistance towards the end of the rotational movement, or vice versa. Furthermore, the drum 6 may have another geometry than the circular one described above. For example, it may be eccentric, which implies that a varying pretensioning force can be obtained during the pretensioning phase.

Instead of the pyrotechnic pretensioner 11 which has been described above, some other type of pretensioning device can be used in the present invention.

The present invention can be used in connection with different types of vehicles, for example cars, trucks or buses.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A safety belt device for vehicles comprising a seat belt, a retractor for retracting said seat belt, a seat belt guide for guiding said seat belt, a displacement member for displacing said seat belt guide between a normal operating condition and a tightened condition for said seat belt, said displacement member comprising a rotatable drum upon which said seat belt guide is mounted, and an activator for activating said displacement member into said tightened condition, said displacement member including energy absorbing means for reducing the force exerted upon said seat belt guide by said seat belt during return of said seat belt guide from said tightened condition to said normal operating condition.

2. The safety belt device of claim 1 wherein said activator causes rotation of said rotatable drum.

3. The safety belt device of claim 1 wherein said retractor includes a central axis of rotation and said rotatable drum includes a central axis of rotation, said seat belt guide extending in a direction substantially parallel to said central axes of rotation of said retractor and said rotatable drum.

4. The safety belt device of claim 1 wherein said energy absorbing means comprises a pin associated with said rotatable drum and a slot cooperating with said pin.

5. The safety belt device of claim 4 including a bracket supporting said rotatable drum, said bracket fixedly mounted with respect to said vehicle, said pin protruding from said rotatable drum and said slot disposed in said bracket.

6. The safety belt device of claim 1 wherein said rotatable drum is adapted to displace said seat belt guide along a circular arc.

7. The safety belt device of claim 1 wherein said activator activates said displacement member into said tightened condition in response to a collision of said vehicle.

8. The safety belt device of claim 7 including an acceleration sensor mounted in said vehicle, said activator comprising a pyrotechnic pretensioning device activated by means of said acceleration sensor.

9. A vehicle seat including a safety belt device according to claim 1.

* * * * *